INVENTOR
GEORGE L. HAYWOOD
BY
ATTORNEY

United States Patent Office 3,564,782
Patented Feb. 23, 1971

3,564,782
ABRASIVE BELT JOINT
George L. Haywood, Latham, N.Y., assignor to Norton Company, Troy, N.Y., a corporation of Massachusetts
Filed June 6, 1967, Ser. No. 643,884
Int. Cl. B24d 11/00
U.S. Cl. 51—399             4 Claims

ABSTRACT OF THE DISCLOSURE

A joint is formed in a thick, resiliently compressible material by undercutting at least one end of the material to provide a greater length at the top surface than at the bottom and then compressing the additional material contained in such greater length before joining the undercut end to the other end of such material. This results in a greater density of material at the top surface of the joint and as the joint passes over a small roll or the like, the compressed material expands and keeps the joint from gapping at the top surface thereof.

CROSS-REFERENCES

The joint of this invention finds special utility in the forming of endless belts from the abrasive materials disclosed in my copending applications, Ser. No. 632,978 filed Apr. 24, 1967, now Pat. 3,262,997, and Ser. No. 638,042, filed May 12, 1967, now Pat. 3,272,526. In such cases the material generally comprises a conventional paper, film or cloth backing to which is laminated a relatively thick, resiliently compressible plastic foam layer having abrasive grain on and/or in the surface thereof. Such foam layer may be formed of polyurethane, for example.

The present invention relates in general to belt joints and more specifically to belt joints and the method of making the same for coated abrasive products wherein a relatively thick, resiliently compressible layer of material forms one component of such coated abrasive products.

BACKGROUND OF THE INVENTION (1) The invention lies in the field of belt joining and more specifically in the joining of thick, resiliently compressible material to form endless belts.

(2) While the problem solved by this invention exists in other arts, it is of particular concern in the abrasive art. Coated abrasive belts are a major tool of industry and the requirements of such belts are that the joint be free-running, strong and leave no "chatter mark" on the workpiece being abraded. Conventional joints do a good job in this respect so long as the overall thickness of the material being joined is small. Where a thick piece of material is to be joined, and particularly where the outer or work-contacting surface is made of a material having poor or limited cohesive strength, tearing and gapping of the joint at the outer surface thereof results when the belt is run over a pulley or contact wheel. Obviously, this problem becomes more acute as the diameter of the pulley or contact wheel is decreased or the thickness of the belt is increased. The development of so-called "foamed" abrasives has created a particularly difficult problem in this regard.

SUMMARY

By providing a belt joint having increased density at the outer or work-contacting surface and having the ability to differentially expand as it passes over a contact wheel, the problem of gapping or tearing of the joint at the outer surface has been effectively eliminated. The joint having these capabilities is produced, as described below, by so cutting the ends to be joined as to leave excess material at the top surface. Thus when the ends of the bottom surface are abutted and joined, such excess material is compressed but remains free to re-expand as the joint passes over a curved surface, as for example a wheel, where the outer surface is subjected to greater tension than the interior or bottom surface.

DRAWINGS

DESCRIPTION OF PREFERRED EMBODIMENTS

Normally, it is desirable in a coated abrasive belt joint for the joint to extend other than at right angles to the length direction of the belt. In other words, the joint will extend across the belt at an angle of other than 90°. Such approach can also and is preferably used with the present joint.

However, where the cut for the usual joint is made perpendicular to the belt material so that the upper abrasive surface and the lower backing surface end at a common vertical plane, the present invention requires that an undercut be made from the top surface. Commencing at the upper surface, the material is cut away from the normal vertical plane of juncture so that a decreasing amount of material remains as the cut progresses from the top to the bottom surface of the material. This permits an excess of material in the upper portion of the belt which is subsequently compressed as the lower backing surfaces are abutted and joined.

Figure 1:
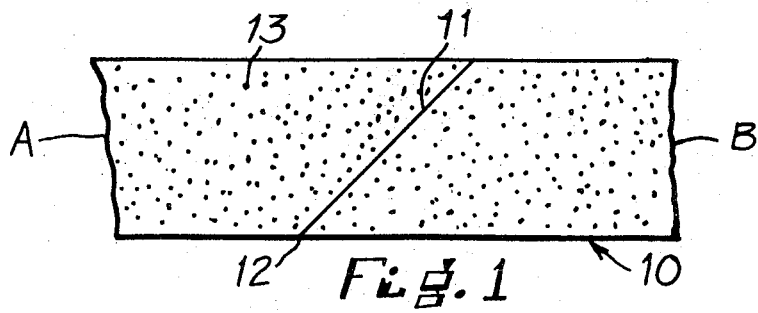
FIG. 1 is a top plan view of an abrasive belt incorporating the joint of the present invention.
Figure 2:
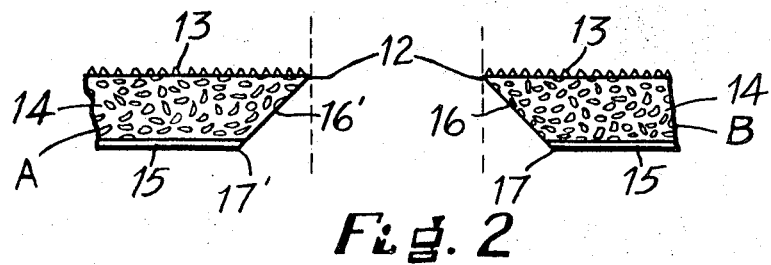
FIG. 2 is a partial side view taken to include the joint in the belt of FIG. 1 showing the edges of the materials prior to joining.

Referring now to the drawings, as an illustration of this invention, a coated abrasive belt 10 is shown wherein two segments (usually ends of the same strip) A and B are illustrated as joined along the line 11 as shown in FIG. 1. Before joining, the ends of segments A and B are undercut as shown in FIG. 2. The illustrated version shows a relatively thick foam layer 14 having a layer of abrasive grains 13 bonded to the top surface thereof. The point 12 at the end of the abrasive layer is used as a reference point to locate the drawing in relation to FIG. 1, 12 being the point where the two ends of such abrasive surface come into juxtaposition after the splice is made. As shown, the resiliently compressible foam layer 14 is laminated to a more incompressible flexible backing member 15. While the cut for the splice extends at an angle across the top surface of the belt 10 as shown in FIG. 1, it also, in this invention extends at an angle through the material forming the belt (at least as to one end—both ends being here illustrated as so angled). The cut extends from the top abrasive surface down through the foam layer 14 along the line 16 or 16' as shown for B and A segments respectively so that the backing member 15 terminates as at 17 or 17' short of a vertical plane through the end of the abrasive layer (shown in dotted lines).

Figure 3:
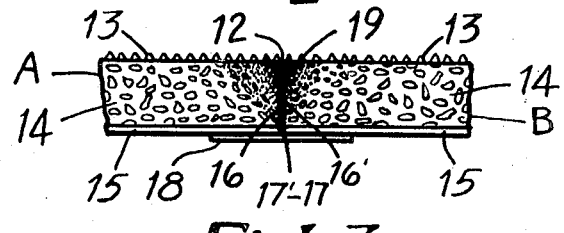
FIG. 3 is a view corresponding to FIG. 2 and showing the edges of the material after joining.

FIG. 3 illustrates the actual joint where the two segments A and B, cut as shown in FIG. 2, are brought together. The excess foam material of layer 14 is compressed as shown by the shaded portion 19 with the ends of the backing member 15 being firmly butted together as at 17'–17. If desired, a reinforcing sealing strip 18 may be placed over the joint on the bottom surface and adhered in place or the edges of the joint may be adhesively coated to hold them together. The result of bringing the strips together is that the joint line 16–16' now becomes essentially perpendicular to the plane of the belt material. This places a considerable excess of foam material 14 in the upper portion of the joint area as shown at 19, resulting in a density gradient from the surface to the back of the belt along the joint. Since the belt must run smoothly, the upper surfaces (here represented as an abrasive layer 13) must continue to lie, after joining, in substantially the same horizontal plane as before joining.

Figure 4:
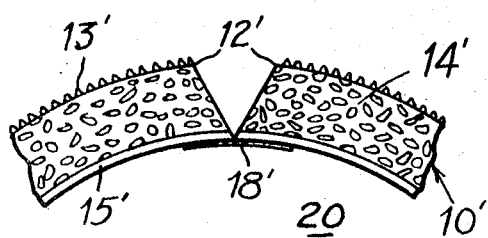
FIG. 4 illustrates a belt made of the same material as that in FIGS. 1–3 but with a straight (nonundercut) butt joint and shows how such a belt gaps when it passes over a contact wheel.
Figure 5:
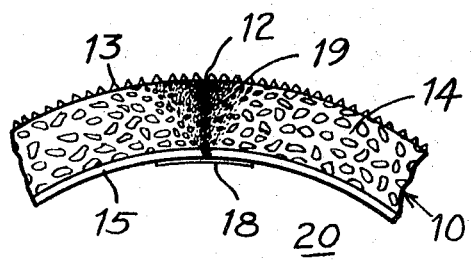
FIG. 5 illustrates the belt of FIGS. 1–3 incorporating the present invention and shows how the joint of this invention prevents gapping as in the case of the conventional joint of FIG. 4.

FIGS. 4 and 5 illustrate the conventional vertical joint in FIG. 4 versus the joint of this invention in FIG. 5 as the two belts are passed over a contact wheel 20. In FIG. 4, the conventional joint will gap with the ends 12' of the abrasive surface of the joint coming apart as shown. In the joint of this invention as shown in FIG. 5, the excess material expands as shown at 19 retaining a smooth nongapped abrasive surface.

The degree of the undercut may vary depending upon the thickness and compressibility of the material and the expected curvature of the contact wheel or pulley over which it is to run in service. Generally, it has been found that the angle between the cut surface and the upper surface of the material can be varied from just short of a right angle, i.e., from about 89°, to as much as 45°, with the preferred and usual range being between about 50° and 85°. The thickness of the resiliently compressible material may vary to any extent, e.g., to one inch or more. However, as illustrated in my aforementioned copending applications, the foam abrasive belt will generally have a layer of from 1/32" to 1/8" of resiliently compressible material.

Although described in connection with a foam-abrasive belt, obviously the invention is applicable wherever the material to be joined has a thick, resiliently compressible body. With the illustrated material, the joining is of the laminated supporting member but, again, it could be of a skin or other surface on the foam or other compressible material if desired. In general, this joint is suitable with adhesive means holding the joined segments together substantially only at the lower surface thereof. In some instances, however, the entire contacting surface of the material within the joint (lines 16'–16 in FIG. 2) may be adhesively coated in lieu of, or in addition to, the adhesive joining of the base material.

I claim:
1. A joint connecting two segments of material at least the upper portions of which are relatively thick and resiliently compressible, to form an endless belt which comprises a zone of varying density of such compressible material at the point of juncture of the two segments thereof, said density progressively decreasing from greater than that of the compressible material elsewhere in each segment at the upper end of said zone adjacent the upper surface of said material to not less than the same density as that of the compressible material elsewhere in each segment at the lower end of said zone; and adhesive means retaining at least the lower edges of said segments in abutted relationship.

2. A belt joint as in claim 1 wherein the adhesive means is disposed only at the base of said zone and adjacent the lower edge of each of said segments.

3. A belt joint as in claim 1 wherein the thick and resiliently compressible material is a plastic foam laminated to a flexible, relatively incompressible backing.

4. A belt joint as in claim 3 wherein said foam contains abrasive particles bonded in and on at least its upper surface.

References Cited
UNITED STATES PATENTS

| | | | |
|---|---|---|---|
| 1,999,733 | 4/1935 | Luehrs | 161—124 |
| 2,129,622 | 9/1938 | Manchester | 161—124 |
| 3,141,206 | 7/1964 | Stephens | 161—149 |
| 3,400,030 | 9/1968 | Burger | 156—159 |

DOUGLAS J. DRUMMOND, Primary Examiner

U.S. Cl. X.R.

156—304; 161—166

UNITED STATES PATENT OFFICE
CERTIFICATE OF CORRECTION

Patent No. 3,564,782          Dated February 23, 1971

Inventor(s) George L. Haywood

It is certified that error appears in the above-identified patent and that said Letters Patent are hereby corrected as shown below:

Column 1, line 28, "no Pat. 3,262,997" should read -- now abandoned --; line 29, ", now Pat. 3,272,526" should be cancel Signed and sealed this 14th day of September 1971.

(SEAL)
Attest:

EDWARD M. FLETCHER, JR.
Atttesting Officer

ROBERT GOTTSCHALK
Acting Commissioner of Paten